(12) United States Patent
Takebayashi

(10) Patent No.: US 8,897,551 B2
(45) Date of Patent: Nov. 25, 2014

(54) DATA PROCESSING APPARATUS WITH HORIZONTAL INTERPOLATION

(75) Inventor: Tomoharu Takebayashi, Chiba (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/511,553

(22) PCT Filed: Nov. 26, 2010

(86) PCT No.: PCT/JP2010/006911
§ 371 (c)(1),
(2), (4) Date: May 23, 2012

(87) PCT Pub. No.: WO2011/065012
PCT Pub. Date: Jun. 3, 2010

(65) Prior Publication Data
US 2012/0281136 A1 Nov. 8, 2012

(30) Foreign Application Priority Data

Nov. 27, 2009 (JP) ................................ 2009-270272
Nov. 27, 2009 (JP) ................................ 2009-270273

(51) Int. Cl.
*G06K 9/00* (2006.01)
*H04N 5/345* (2011.01)
*H04N 9/04* (2006.01)
*H04N 9/07* (2006.01)
*H04N 101/00* (2006.01)

(52) U.S. Cl.
CPC ............... *H04N 9/07* (2013.01); *H04N 5/3458* (2013.01); *H04N 9/045* (2013.01); *H04N 2101/00* (2013.01)
USPC ......................................... 382/162; 382/167

(58) Field of Classification Search
None
See application file for complete search history.

(56) References Cited

U.S. PATENT DOCUMENTS

| 8,452,090 B1* | 5/2013 | Brunner et al. ............... 382/167 |
| 2004/0126019 A1 | 7/2004 | Ikebe et al. |
| 2004/0165082 A1* | 8/2004 | Takai ........................... 348/222.1 |
| 2005/0213812 A1 | 9/2005 | Ishikawa et al. |
| 2009/0153683 A1 | 6/2009 | Furukawa |
| 2010/0277628 A1 | 11/2010 | Sawada et al. |

FOREIGN PATENT DOCUMENTS

| JP | A-2002-8457 | 1/2002 |
| JP | A-2004-128583 | 4/2004 |
| JP | A-2005-286415 | 10/2005 |
| JP | A-2008-67315 | 3/2008 |
| JP | A-2009-147489 | 7/2009 |

OTHER PUBLICATIONS

Feb. 15, 2011 International Search Report issued in International Patent Application No. PCT/JP2010/006911 (with translation).

* cited by examiner

*Primary Examiner* — Li Liu
(74) *Attorney, Agent, or Firm* — Oliff PLC

(57) ABSTRACT

There are provided horizontal interpolation unit which creates interpolation data for each of pixels forming a horizontal line and performs interpolation in order for each of the pixels to have two color data of the interpolation data and original pixel data, for each horizontal line of Bayer data output from an imaging section; and data size reducing unit which creates data having reduced data amount (data size) for each horizontal line by using the two color data of each of the pixels and outputs Bayer data being formed with the data being created.

6 Claims, 8 Drawing Sheets

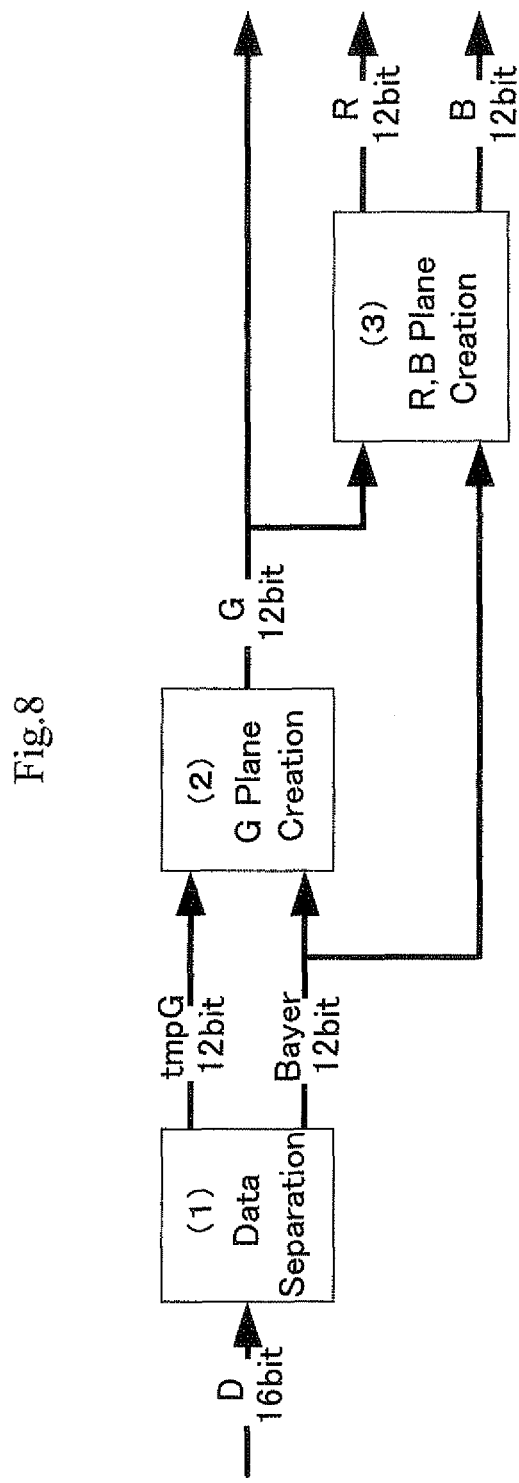

DATA PROCESSING APPARATUS WITH HORIZONTAL INTERPOLATION

CROSS-REFERENCE TO RELATED APPLICATIONS

This application is a U.S. National Stage application claiming the benefit of prior filed International Application Number PCT/JP2010/006911, filed Nov. 26, 2010, in which the international Application claims a priority date of Nov. 27, 2009 based on prior filed Japanese Application Number 2009-270272 and Japanese Application Number 2009-270273, the entire contents of which are incorporated herein by reference.

TECHNICAL FIELD

The present application relates to a data processing apparatus which reduces a data size of image data in a format based on the Bayer array.

BACKGROUND ART

In recent years, not only video cameras but also digital still cameras and mobile phones capable of taking moving image have become common. Moreover, in these apparatuses, the number of pixels in an imaging sensor has increased, and those with an imaging sensor having more than 10 million pixels are appearing on the market as a matter of course.

Such an apparatus having more pixels outputs image data with an extremely large data amount (data size) from the imaging sensor if photographing is performed as it is. Accordingly, the data size of the image data output from the imaging sensor is required to be reduced due to limitation on performances and a price so that these apparatuses can shoot moving image.

Hence, Patent Document 1 discloses a method of reducing a data size by performing resizing processing on image data in a format based on the Bayer array at the stage of Bayer data before interpolation, for example. Furthermore, Patent Document 2 discloses a method of reducing the data size of the output image data (Bayer data) by driving the imaging sensor in a pixel addition mode.

[Patent Document 1] Japanese Unexamined Patent Application Publication No. 2002-8457
[Patent Document 2] Japanese Unexamined Patent Application Publication No. 2009-147489

DISCLOSURE

Problems to be Solved

Incidentally, from the viewpoint of an image quality, the method is desirable in which interpolation is performed on image data (Bayer data) output from an imaging sensor and the data size is reduced at a stage after each pixel has all the colors of R, G, and B, unlike prior-art methods. Then, deterioration in the image quality which causes a problem in the prior-art methods comes to be able to be minimized.

However, by doing so, the apparatus has to handle image data with the data size three times larger than the original Bayer data and that also causes a problem in terms of performances and a cost.

A proposition of the present application is to provide a data processing apparatus which can reduce a data size of Bayer data while deterioration of an image quality is suppressed.

Means for Solving the Problems

A data processing apparatus according to the present embodiment includes horizontal interpolation unit which creates interpolation data for each of pixels forming a horizontal line and performs interpolation in order for each of the pixels to have two color data of the interpolation data and original pixel data, for each horizontal line of Bayer data output from an imaging section; and data size reducing unit which creates data having reduced data amount (data size) for each horizontal line by using the two color data of each of the pixels and outputs Bayer data being formed with the data being created.

Moreover, the horizontal interpolation means may perform interpolation by using the following expressions (1) to (5).

Furthermore, the data processing apparatus according to the present embodiment includes horizontal interpolation unit which creates interpolation data for each of pixels forming a horizontal line and performs interpolation in order for each of the pixels to have two color data of the interpolation data and original pixel data, for each horizontal line of Bayer data output from an imaging section; and data size reducing unit which creates thinning data having reduced data amount (data size) for each horizontal line by using the two color data of each of the pixels and which synthesizes and outputs synthesized data having reduced data amounts (data sizes) of at least R plane data and B plane data from the thinning data.

In addition, the data size reducing means may perform creation of the synthesized data by using the following expressions (10) to (11).

BRIEF DESCRIPTION OF THE DRAWINGS

FIG. 8 is a block diagram of interpolation processing.

DETAILED DESCRIPTION OF THE EMBODIMENTS

Embodiment

An embodiment of the present invention will be described below. The present embodiment is an embodiment of a digital camera.

Figure 1:
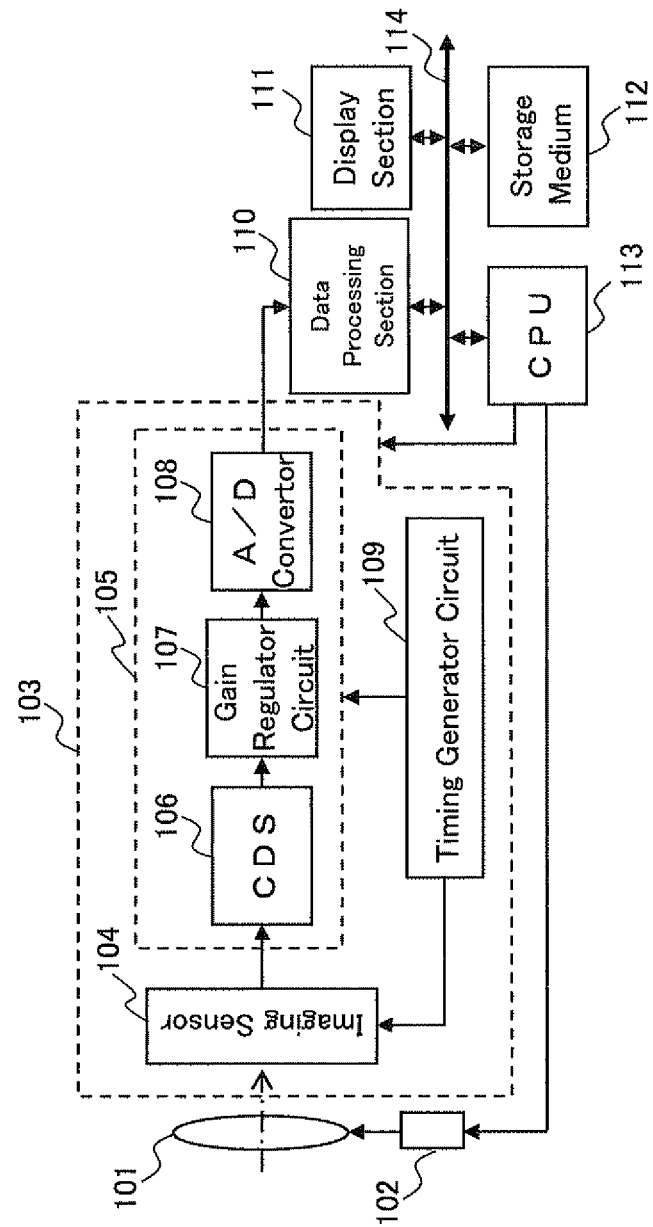
FIG. 1 is a block diagram illustrating a configuration of a digital camera of an embodiment.

FIG. 1 is a block diagram illustrating a configuration of a digital camera of the present embodiment.

The digital camera includes an imaging lens 101, a lens drive section 102, an imaging section 103, a data processing section 110, a display section 111, a storage medium 112, and a CPU 113 which integrally controls the digital camera. Here, the lens drive section 102 and the imaging section 103 are connected to the CPU 113, respectively. Moreover, the CPU 113, the data processing section 110, the display section 111, and the storage medium 112 are connected via a bus 114.

The imaging section 103 has an imaging sensor 104, an AFE (analog front end) circuit 105, and a timing generator circuit 109. In addition, the AFE circuit 105 has a CDS (Correlated double sampling) circuit 106, a gain regulator circuit 107, and an A/D conversion circuit 108.

The imaging lens 101 has a plurality of lens groups including a focus lens and a zoom lens. It should be noted that for simplification, the imaging lens 101 is illustrated as a single lens in FIG. 1.

The lens drive section 102 generates a lens drive signal in accordance with an instruction of the CPU 113, performs focusing and zooming by moving the imaging lens 101 in an optical axis direction, and forms a subject image by a light flux having passed through the imaging lens 101, on a light receiving surface of the imaging sensor 104.

The imaging sensor 104 is an imaging sensor capable of shooting a moving image and is made of a CCD imaging sensor, a CMOS imaging sensor or the like. Meanwhile, the imaging sensor 104 is naturally capable of shooting a still image for one frame. Moreover, the imaging sensor 104 is an imaging sensor capable of thinning read-out, pixel addition (mixing) read-out, full-pixel read-out, and window read-out (crop).

The imaging sensor 104 is arranged on the image space side of the imaging lens 101 and photoelectrically converts a subject image formed on the light receiving surface to output an analog image signal.

A plurality of photo diodes is arrayed in a two-dimensional manner on a light receiving surface of the imaging sensor 104. Moreover, on the light receiving surface, primary color filters of red (R), green (G), and blue (B) are arranged in the Bayer array corresponding to each photo diode, for color photography of the subject image. As a result, an analog image signal output from the imaging sensor 104 includes color signal components of R, G, and B.

An arranging method of the primary color filter will be described here in brief.

Figure 2:
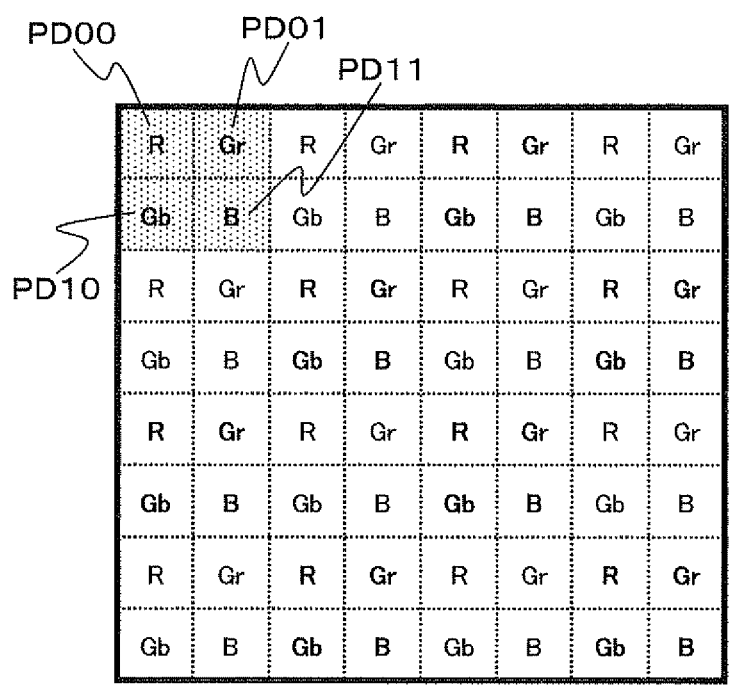
FIG. 2 is an explanatory diagram of an arraying method (Bayer array) of a primary color filter of an imaging sensor 104.

On the light receiving surface of the imaging sensor 104, the primary color filters of red (R), green (G), and blue (B) are arranged in the Bayer array corresponding to each photo diode (PD). Specifically, as illustrated in FIG. 2, the primary color filters are arranged in an array repeating an array pattern (Bayer pattern) of "R, Gr, Gb, and B" such that red (R) is arranged for PD00, green (Gr) for PD01, green (Gb) for PD10, and blue (B) for PD11. Meanwhile, the green (G) filter is arranged both for PD01 and PD10, but the filter for PD01 is shown as "Gr" and the filter for PD10 is shown as "Gb" as described above in order to discriminate on which the filter is arranged.

By arranging the primary color filters in this way, a type of each pixel (photo diode) on the light receiving surface is determined. That is, four types of R (red), Gr (first green), Gb (second green), and B (blue) are determined in the above-described Bayer array.

The CDS circuit 106 samples both a signal at the time of reset (before exposure) of an analog image signal the imaging sensor 104 outputs and a signal at the time of data transfer (after exposure), and removes noise caused by dark current from the analog image signal by subtracting a signal value at the time of reset from a signal value at the time of data transfer.

The gain regulator circuit 107 sets a gain regulation amount of the analog image signal based on an instruction of the CPU 113. As a result, the gain regulator circuit 107 regulates shooting sensitivity corresponding to ISO sensitivity for the analog image signal which the CDS circuit 106 outputs after the noise removal.

The A/D conversion circuit 108 converts the analog image signal the gain regulator circuit 107 outputs into digital data. Then, the A/D conversion circuit 108 outputs the digital data (image data), as an output of the imaging section 103, to the data processing section 110.

The timing generator circuit 109 supplies a timing pulse to the imaging sensor 104 and the AFE circuit 105 based on an instruction of the CPU 113. By means of this supply of the timing pulse, driving timing of the imaging sensor 104 or each circuit in the AFE circuit 105 is controlled. In the imaging sensor 104, for example, timing to read out a charge from the photo diode on the light receiving surface is controlled, and in the CDS circuit 106, for example, in the AFE circuit 105, timing of sampling the analog image signal the imaging sensor 104 outputs is controlled.

The data processing section 110 performs various types of image processing such as horizontal size reduction processing, interpolation, white balance adjusting, edge enhancement, gamma correction and the like to the image data (Bayer data) which the imaging section 103 outputs in accordance with an instruction of the CPU 113. This data processing section 110 is made as an ASIC or the like. The horizontal size reduction processing will be described later.

The display section 111 is an LCD monitor provided on the back surface of a digital camera housing, an electronic finder provided with an eye space section and the like, and displays various images including moving image and still images in accordance with an instruction of the CPU 113.

The storage medium 112 includes a memory card, a small-sized hard disk, an optical disk such as a DVD and the like. It should be noted that the storage medium 112 may be built in the digital camera, detachably attached to the digital camera or provided externally. When the storage medium 112 is provided externally, the storage medium 112 and the digital camera are electrically connected to each other by a wire or wirelessly.

The storage medium 112 records image data and the like, subjected to compression processing by the CPU 113. It should be noted that the compression is performed in the MPEG (Moving Picture Experts Group) format for moving image, the PEG (Joint Photographic Experts Group) format for still images or the like.

The CPU 113 integrally controls each section in the digital camera in accordance with operation contents of an operation member by a user.

For example, if a moving image shooting button is pressed down during an operation of the digital camera in a shooting mode, the CPU 113 drives the lens drive section 102 and the imaging section 103 and starts shooting of moving image. At this time, the imaging sensor 104 of the imaging section 103 is driven so that an image with predetermined resolution is obtained at a predetermined frame rate, and image data (moving image data) corresponding to each frame of the moving image is sequentially output to the data processing section 110 via the AFE circuit 105 of the imaging section 103.

After that, the CPU 113 performs required image processing on the image data (moving image data) output from the imaging section 103 as above by driving the data processing section 110. Moreover, the CPU 113 displays the moving image data after the image processing on the display section 111. Then, the CPU 113 performs compression processing in the MPEG format or the like on the moving image data after image processing and records the moving image data after the compression in the storage medium 112.

It should be noted that during the shooting of moving image, the CPU 113 continuously performs control operations of autofocus (AF) and automatic exposure (AE).

Moreover, if the moving image shooting button is pressed down again during the shooting of moving image, the CPU 113 stops the above-described operations and finishes the shooting of the moving image.

Incidentally, in the shooting of moving image, as described above, the data amount (data size) of the moving image data needs to be reduced, but there is a problem in which the image quality of the moving image data is deteriorated by the size reduction.

Therefore, the digital camera of the present embodiment reduces the data size of the moving image data (hereinafter referred to only as size) while deterioration of the image quality is suppressed by performing the following operations at the time of the shooting of moving image.

Meanwhile, in the following, as an example, an operation in which an output of an imaging sensor having 6000×4000 effective pixels (the imaging sensor 104 of the imaging section 103 in the present embodiment) is reduced to the size of 2000×1126 pixels (⅓) in order to obtain a full HD moving image will be described.

(Vertical Size Reduction Processing)

First, the CPU 113 performs vertical size reduction processing in order to reduce the 4000 pixels which are effective pixels in the vertical (longitudinal) direction of the imaging sensor 104, to 1126 pixels.

Specifically, in order to adapt the angle of view to 16:9, 3378 pixels close to the center among the 4000 pixels arrayed in the vertical (longitudinal) direction on the light receiving surface of the imaging sensor 104 are chosen as targets for crop. For example, the remaining 3378 pixels excluding 311 pixels each on the upper and lower sides are chosen as the targets for crop.

Moreover, among the 3378 pixels, one pixel at the center in each three pixels in the vertical (longitudinal) direction is excluded, and the remaining two pixels in the same color are used as read-out targets for thinning read-out and also as targets for addition (synthesizing) read-out.

Then, the CPU 113 drives the imaging sensor 104 so as to read out the target pixels in a mode in combination of the crop, the thinning read-out, and the pixel addition (synthesizing) read-out.

Figure 3:
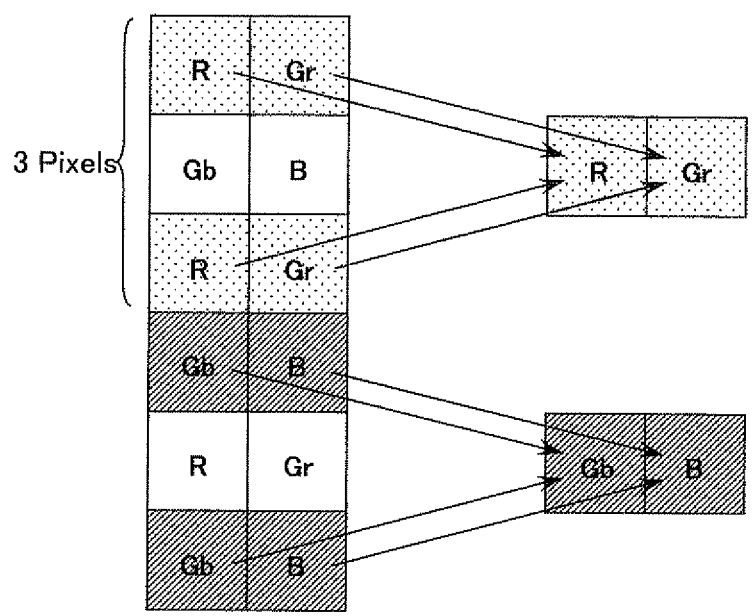
FIG. 3 is a diagram illustrating an image of which a target pixel is read out in vertical size reduction processing.

Here, an image in which the target pixels are read out is illustrated in FIG. 3. For example, in three pixels of "R", "Gb" and "R" arrayed in the vertical (longitudinal) direction on the upper left in FIG. 3, which are the target pixels, one "Gb" pixel at the center is thinned, the remaining two "R" pixels in the same color are added (synthesized), and as a result, one "R" pixel on the upper right in FIG. 3 is read out.

In this way, the CPU 113 outputs image data (Bayer data) having 6000×1126 pixels obtained by reducing the 3378 pixels in the vertical (longitudinal) direction to ⅓ (1126 pixels), from the imaging section 103.

(Horizontal Size Reduction Processing)

Subsequently, the CPU 113 performs horizontal size reduction processing on the image data (Bayer data) output from the imaging section 103 in order to reduce the 6000 pixels which are effective pixels in the horizontal (lateral) direction, to 2000 pixels.

The horizontal size reduction processing is performed before interpolation, as one of image processing in the data processing section 110. That is, the CPU 113 performs the horizontal size reduction processing by driving the data processing section 110, on the image data (Bayer data) output from the imaging section 103.

Figure 4:
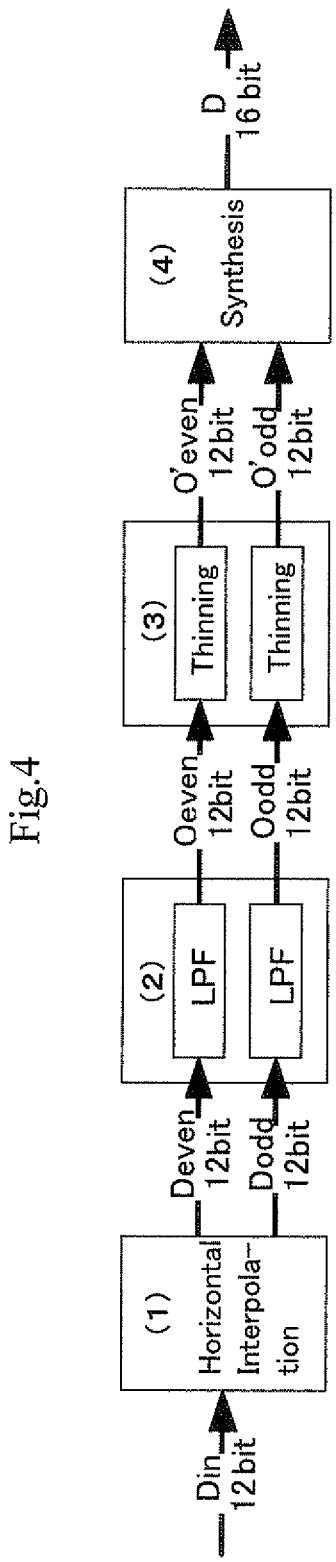
FIG. 4 is a block diagram of horizontal size reduction processing.

FIG. 4 is a block diagram of the horizontal size reduction processing.

Details of the horizontal size reduction processing will be described below along this block diagram.

(1) Horizontal Interpolation Processing

The data processing section 110 driven by the CPU 113 performs "horizontal interpolation processing" for each pixel line (horizontal line) in the horizontal (lateral) direction by using image data (Bayer data) from the imaging section 103 as an input.

It should be noted that in the "horizontal interpolation processing", the input data of each pixel in the horizontal line is supposed to have a bit width of "12 bits" as illustrated in FIG. 4.

The data processing section 110 first creates interpolation data for a target pixel from data (pixel values) of four pixels in the same color close to the target pixel among the pixels on the horizontal line by the following expression (1).

Figure 5:
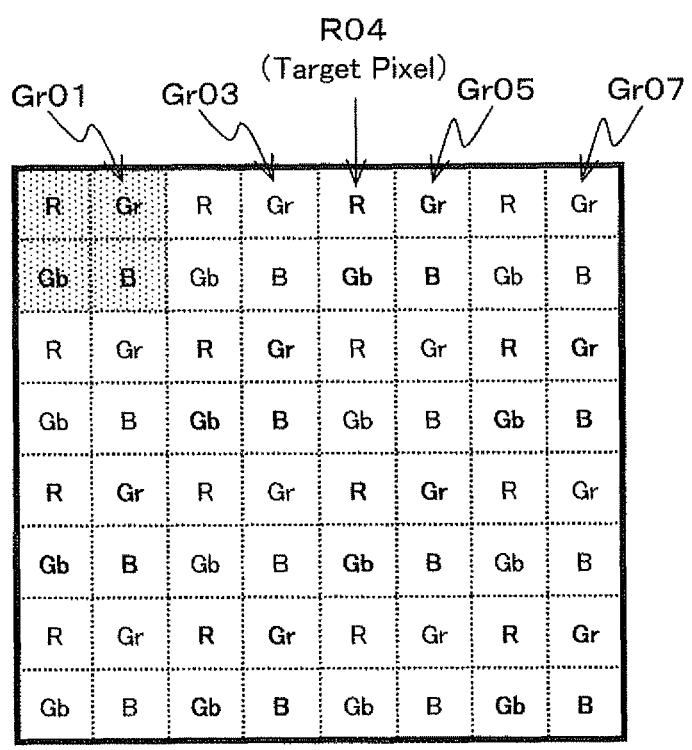
FIG. 5 is a diagram illustrating an image of creating interpolation data with respect to a target pixel in horizontal interpolation processing.

When R04 with an R (red) pixel is a target pixel, for example, as illustrated in FIG. 5, interpolation data "Gr*" of a Gr component for the target pixel is created based on four pixels in the same color in its neighborhood, that is, data of Gr01, Gr03, Gr05, and Gr07 of the Gr (first green) pixel.

In this way, when the R (red) pixel is a target pixel, the interpolation data "Gr*" of the Gr component for the target pixel is created in the expression (1) based on the data of the four Gr (first green) pixels in its neighborhood. On the other hand, when a Gr (first green) pixel is a target pixel, interpolation data (R*) of an R component for the target pixel is created based on data of four R (red) pixels in its neighborhood.

As a result, the target pixel comes to have two pieces of color data of the original data of input ("R", for example) and the interpolation data (if the original data is "R", for example, it is "Gr*").

$$IMP(i) = \frac{\sum_{a=0}^{3} k\_imp(a) \cdot Din(i + 2a - 3)}{\sum_{a=0}^{3} k\_imp(a)} \quad (1)$$

Meanwhile, "Din(i)" in the expression (1) indicates data of a pixel in each horizontal line in input Bayer data.

Moreover, "i" indicates a position of a target pixel (pixel to be processed) in each horizontal line. Meanwhile, in this explanation, "i" is a value of "i=0 to Wide−1", and Wide is "6000" of the number of effective pixels in the horizontal (lateral) direction.

Moreover, "Limp" is a coefficient for weighting, and a value "k_imp=[−1, 9, 9, −1]" or the like is set in advance.

Then, "IMP(i)" indicates interpolation data for the created target pixel.

Next, the data processing section 110 corrects the interpolation data for the target pixel created as described above by using the following expressions (2) to (4).

Specifically, a difference "CD(i)" between the original data and the interpolation data of the target pixel, that is, the two pieces of color data is obtained by the expression (2).

Subsequently, based on the data of the obtained difference, a color difference average of adjacent five pixels with the target pixel at the center, that is, "CD(i−2), CD(i−1), CD(i), CD(i+1), CD(i+2)" is calculated by the expression (3), and the calculated data of the color difference average is set as correction data "CD_avg(i)" for the target pixel.

Then, the correction data is subtracted from the original data of the target pixel or added to the original data by the expression (4), and thus the interpolation data for the target pixel is corrected.

In this way, the interpolation data "IMP'(i)" after the correction is obtained.

Meanwhile, in the expression (2), the difference can be obtained by subtracting the Gr (first green) component from the R (red) component when the target pixel is any of the R (red) pixel, the Gr (first green) pixel.

Moreover, in the expression (4), when the R (red) pixel is the target pixel, data "Gr^" of the Gr component is obtained as the interpolation data "IMP(i)" after correction. On the other hand, when the Gr (first green) pixel is the target pixel, data "R^" of the R component is obtained as the interpolation data "IMP'(i)" after correction.

$$CD(i) = \begin{cases} Din(i) - IMP(i) & (\text{if } i = \text{even number}) \\ IMP(i) - Din(i) & (\text{if } i = \text{odd number}) \end{cases} \quad (2)$$

$$CD\_avg(i) = \frac{\sum_{a=-2}^{2} k\_cd(a+2) \cdot CD(i+a)}{\sum_{a=-2}^{2} k\_cd(a+2)} \quad (3)$$

$$IMP'(i) = \begin{cases} Din(i) - CD\_avg(i) & (\text{if } i = \text{even number}) \\ Din(i) + CD\_avg(i) & (\text{if } i = \text{odd number}) \end{cases} \quad (4)$$

Meanwhile, "k_cd" in the expression (3) is a coefficient for weighting used in obtaining the above-described color difference average, and a value like, for example, "k_cd=[1, 2, 2, 2, 1]" is set in advance.

When the interpolation data "IMP'(i)" after the correction as described above is obtained, the data processing section 110 outputs two pieces of color data of the original data "Din(i)" and the interpolation data "IMP'(i)" after the correction, to each pixel which becomes the target pixel in the horizontal line, respectively, as an output of the "horizontal interpolation processing".

$$Deven(i) = \begin{cases} Din(i) & (\text{if } i = \text{even number}) \\ IMP'(i) & (\text{if } i = \text{odd number}) \end{cases} \quad (5)$$

$$Dodd(i) = \begin{cases} IMP'(i) & (\text{if } i = \text{even number}) \\ Din(i) & (\text{if } i = \text{odd number}) \end{cases}$$

Figure 6:
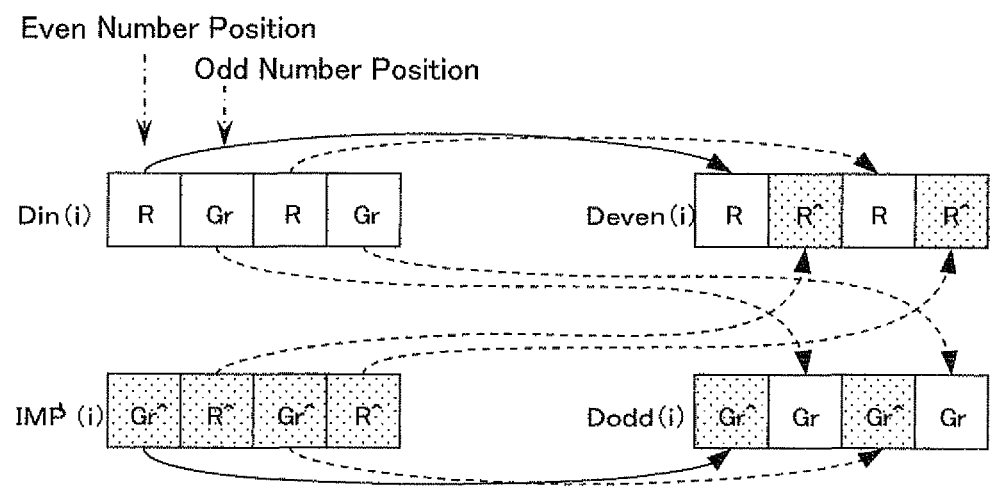
FIG. 6 is a diagram illustrating an image of data output from the horizontal interpolation processing.

Here, FIG. 6 shows data output from the "horizontal interpolation processing" when the input horizontal line is an R/Gr line, that is, an image of "Deven(i)" and "Dodd(i).

As illustrated in FIG. 6, in the "horizontal interpolation processing", when the target pixel "Din(i)" is arranged at an even position on the horizontal line, the input original data "Din(i)" is output as it is in the output "Deven(i)", while the interpolation data "IMP'(i)" after the correction obtained as described above is output in the other output "Dodd(i)". Furthermore, when the target pixel "Din(i)" is arranged at an odd position on the horizontal line, the interpolation data "IMP'" after the correction obtained as described above is output in the output "Deven(i)", while the input original data "Din(i)" is output as it is in the other output "Dodd(i)".

In this way, if the input horizontal line is an R (red)/Gr (first green) line, data of R plane is output in "Deven(i)" and data of Gr plane is output in "Dodd(i). Furthermore, if the input horizontal line is Gb (second green")/B (blue) line, data of Gb plane is output in "Deven(i)" and data of B plane is output in "Dodd(i)".

Since human eyes are said to have higher resolution in the horizontal direction, the data processing section 110 suppresses image quality deterioration of image data (Bayer data) particularly in the horizontal direction by using the above-described "horizontal interpolation processing".

(2) LPF Processing

When the above-described "horizontal interpolation processing" is finished, the data processing section 110 performs "LPF processing" with the outputs "Deven(i)" and "Dodd(i)" as inputs.

Specifically, the data processing section 110 performs LPF (low-pass filter) processing on each of "Deven(i)" data and "Dodd(i)" data by the following expression (6) by using three taps, that is, three adjacent pixels on the horizontal line as the sample points, based on pixel data (pixel values) of three sample points.

Then, the data processing section 110 outputs the data after the processing as "Oeven(i)" and "Oodd(i)".

By performing this "LPF processing", the data processing section 110 suppresses occurrence of moire, jaggy and the like caused particularly by return noise by a frequency component exceeding Nyquist frequency.

$$Oeven(i) = \frac{K1 \cdot Deven(i) + K2 \cdot Deven(i+1) + K3 \cdot Deven(i+2)}{K1 + K2 + K3} \quad (6)$$

$$Oodd(i) = \frac{K1 \cdot Dodd(i) + K2 \cdot Dodd(i+1) + K3 \cdot Dodd(i+2)}{K1 + K2 + K3}$$

It should be noted that "K1, K2, and K3" in the expression (6) are arbitrary coefficients and a value such as, for example, "K1=K2=K3=1" is set in advance.

Moreover, the "LPF processing" can be performed also by using prior-art methods including a bi-cubic method other than the expression (6).

(3) Thinning Processing

When the "LPF processing" is finished, the data processing section 110 performs the "thinning processing" by using the following expressions (7) and (8), with the outputs "Oeven" and "Oodd" as inputs.

Specifically, the data processing section 110 selects a predetermined pixel from continuous "a" pixels on the plane for each plane regarding data of the R plane and the Gr plane (or the Gb plane and the B plane) input as "Oeven" and "Oodd". It should be noted that in this explanation, "a=3" is set in order to reduce the Bayer data to ⅓. Therefore, in this case, a predetermined pixel is selected from continuous "3" pixels on each plane. Then, data of the one pixel selected for the R plane (or the Gb plane) is output as "O'even(j)" and the data of the one pixel selected for the Gr plane (or the B plane) is output as "O'odd(j)".

In this way, the data processing section 110 reduces the data of the R plane and the Gr plane (or the Gb plane and the B plane) input as "Oeven" and "Oodd" to ⅓, respectively.

$$O'even(j) = Oeven(aj + b) \quad (7)$$
$$O'odd(j) = Oodd(aj + b)$$

$$j = 0 \sim RoundDown\left(\frac{Wide - b}{2a}\right) \times 2 - 1 \quad (8)$$

It should be noted that "a" in the expression (8) is a coefficient determined by a reduction rate, and since the Bayer data is reduced to ⅓ in this explanation as described above, a is set to 3.

Furthermore, "b" is offset for specifying which pixel in the continuous "a" pixels in the input data is to be an output of the "thinning processing, and since a is equal to 3 in this explanation, the value is any one of "0 to 2", but b is supposed to be set to 0 here, for example.

Moreover, "RoundDown" in the expression (8) is a function of rounding down fractions.

(4) Synthesizing Processing

After finishing the "thinning processing", the data processing section 110 performs the "synthesizing processing" by using the following expression (9), with the outputs "O'even(j)" and "O'odd(j)" as inputs.

Specifically, when the input data is arranged at an even position on the horizontal line, the data processing section 110 outputs the data of the input "O'even(j)" as "Dout(j)". In contrast, when the input data is arranged at an odd position on the horizontal line, the data processing section 110 outputs the data of the input "O'Odd(j)" as "Dout(j)".

As a result, the input data is arranged in the format based on the Bayer array and is output as "Dout(j)".

j=even number)

$$Dout(j)=O'even(j)$$

j=odd number)

$$Dout(j)=O'even(j) \tag{9}$$

By means of the above-described operations, the data processing section 110 reduces the size of the Bayer data while suppressing deterioration of the image quality.

After that, when the image data reduced to the size of 2000×1126 pixels by the above-described processing (moving image data) is obtained via "Dout(j)", the CPU 113 performs the above-described operation at the time of moving image shooting by performing required image processing including interpolation and the like on the moving image data.

Another Embodiment

Subsequently, another embodiment of the present invention will be described. The present embodiment is an embodiment of a digital camera, and the digital camera is the same as the digital camera in the embodiment illustrated in FIG. 1. Therefore, detailed explanation for each constituent element of the digital camera of the present embodiment will be omitted.

Moreover, operations by the digital camera of the present embodiment are the same as those in the embodiment up to the "thinning processing" illustrated in FIG. 4, and detailed explanation will be omitted. A difference between the present embodiment and the above-described embodiment is that the "synthesizing processing" illustrated in FIG. 4 is performed by using the following expressions (10) to (11), the "interpolation processing" is performed on the synthesized data output by the "synthesizing processing". Therefore, the operations of the "synthesizing processing" and the "interpolation processing" in the present embodiment will be described below.

(4) Synthesizing Processing

After finishing the "thinning processing" illustrated in FIG. 4, the data processing section 110 performs the "synthesizing processing" by using the following expressions (10) and (11) instead of the above-described expression (9), with the outputs "O'even(j)" and "O'odd(j)" as inputs.

R/Gr Line: if j=even number)

$$D(j)[15:0]=O'even(j)[11:2]+O'odd(j)[11:6] \times 1024$$

R/GR Line: if j=odd number)

$$D(j)[15:0]=O'odd(j)[11:0]+O'odd(j-1)[5:2] \times 4096 \tag{10}$$

(Gb/B Line: if j=even number)

$$D(j)[15:0]=O'even(j)[11:0]+O'even(j+1)[5:2] \times 4096$$

(Gb/B Line: if j=odd number)

$$D(j)[15:0]=O'odd(j)[11:2]+O'even(j)[11:6] \times 1024 \tag{11}$$

Figure 7:
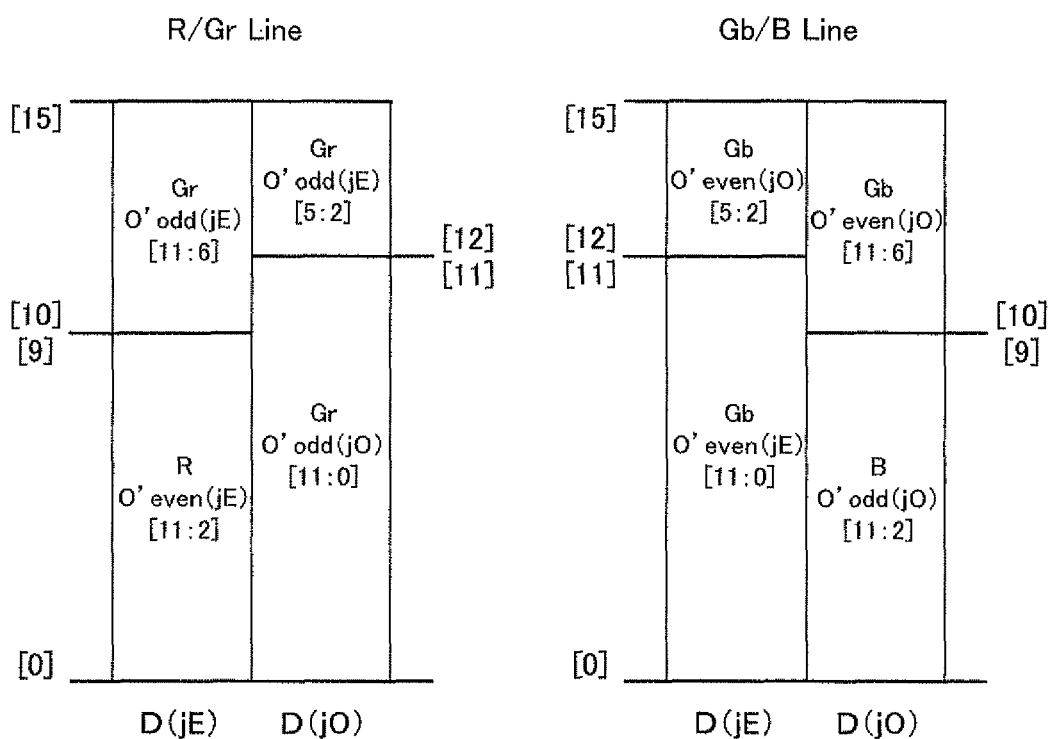
FIG. 7 is an explanatory diagram of synthesizing processing.

Specifically, the data processing section 110 uses two sets of the input data "O'even(j)" and (O'odd(j)", that is, even-numbered "O'even (j=even number)" and "O'odd=even number) in input and odd-numbered "O'even=odd number)" and "O'odd=odd number) in input are used as one set of data and performs the "synthesizing processing" as follows. An image of this "synthesizing processing" is illustrated in FIG. 7. "jE" in FIG. 7 indicates that the data is even-numbered data in input/output, and "jO" indicates that the data is odd-numbered data.

If the input data is data of the R plane and the Gr plane, that is, if the input data is data at the R (red)/Gr (first green) line of the horizontal line, the data processing section 110 synthesizes the even-numbered "O'even(j=even number)" and "O'odd(j=even number)" data in the input having a bit width of "12 bits" or the odd-numbered "O'even(j=odd number)" and "O'odd(j=odd number)" data by using the expression (10) and outputs the synthesis result as one set of data of the even-numbered "D(j=even number)" and the odd-numbered "D(j=odd number)" in the output having a bit width of "16 bits".

Here, the details will be described by using FIG. 7. First, the 2nd to 11th bit (zero "0" equivalent) data (10-bit-length) of the even-numbered R plane data "O'even("jE")" is inserted into the 0th to 9th bit of the data "D("jE")" to be output as even-numbered data in the output.

Next, the 6th to 11th bit data (6-bit-length) of the even-numbered Gr plane data "O'odd("jE")" is inserted into the 10th to 15th bit of the data "D("jE")" to be output as even-numbered data similarly.

Moreover, the 0th to 11th bit data (12-bit-length) of the odd-numbered Gr plane data "O'odd("jO")" is inserted into the 0th to 11th bit of the data "D("jO")" to be output as odd-numbered data in the output.

Subsequently, by using the odd-numbered Gr plane data "O'odd("jE")" again, the 2nd to 5th bit data (4-bit-length) is inserted into the 12th to 15th bit of the data "D("jO")" to be output as odd-numbered data in the output this time.

Then, after making the 16-bit-length data "D("jE")" and "D("jO")" synthesized as described above a set, it is output as a result of the "synthesizing processing".

As described above, by synthesizing data of the total "48 bit("12 bit"×4)" of the even-numbered "O'even("jE")" and "O'odd("jE")" and the odd-numbered "O'even("jO")" and "O'odd("jO")" in the input, data of the total "32 bit("16 bit"× 2)" of the even-numbered data "D("jE")" and the odd-numbered data "D("jO")" in the output is output.

Moreover, if the input data is data of the Gb plane and of the B plane, that is, data at Gb (second green)/B (blue) line on the horizontal line, the data processing section 110 synthesizes the even-numbered "O'even(j=even number)" and "O'odd (j=even number)" data and the odd-numbered "O'even(j=odd number)" and "O'odd(j=odd number)" data in the input having the bit width of "12 bits" by using the expression (11) and outputs the synthesis result as a set of data of the even-numbered "D(j=even number" and odd-numbered "D(j=odd number)" in the output having the bit width of "16 bits".

Here, details will be described by using FIG. 7. First, the 0th to 11th bit data (12-bit-length) of the even-numbered Gb plane data "O'even("jE")" is inserted into the 0th to 11th bit of the data "D("jE")" to be output as even-numbered data in the output.

Subsequently, the 2nd to 5th bit data (4-bit-length) of the odd-numbered Gb plane data "O'even("jE")" is inserted into the 12th to 15th bit of the data "D("jE")" to be output as even-numbered data similarly.

Moreover, the 2nd to 11th bit data (10-bit-length) of the odd-numbered B plane data "O'odd("jO")" is inserted into the 0th to 9th bit of the data "D("jO")" to be output as odd-numbered data in the output.

Subsequently, by using the odd-numbered Gb plane data "O'even("jO")" again, the 6th to 11th bit data (6-bit-length) is inserted into the 10th to 15th bit of the data "D("jO")" to be output as odd-numbered data in the output this time.

Then, by making the 16-bit-length data "D("jE")" and "D("jO")" synthesized as described above a set, this is output as synthesized data of a result of the "synthesizing processing".

In this way, by synthesizing data of the total "48 bit ("12 bit"×4)" of the even-numbered "O'even("jE")" and "O'odd ("jE")" and the odd-numbered "O'even("jO")" and "O'odd ("jO")" in the input, data of the total "32 bit ("16 bit"×2)" of the even-numbered data "D("jE")" and the odd-numbered data "D("jO")" in the output is output.

That is, the data processing section 110 further reduces ⅓ data from the Bayer data with reduced input size by this "synthesizing processing" and decreases the data amount to ⅔ of the original amount.

By means of the above-described operations, the data processing section 110 reduces the size of the data while suppressing deterioration of the image quality.

In the above-described "synthesizing processing", particularly the R plane data and the B plane data in an input with 12-bit-length are reduced to 10-bit-length and are output. This is because at least an information amount of "8 bits" is ensured since image data to be eventually obtained sets the bit width of each of colors R, G, and B of each pixel to be "8 bits" in general. As a result, the data size can be reduced while deterioration of the image quality is suppressed.

Moreover, in the above-described "synthesizing processing", if the input data is data at the R (red)/Gr (first green) line, the odd-numbered R plane data "O'even("jO")" is not used but may be held and used in the subsequent processing. In addition, when the input data is data at the time of the Gb (second green)/B (blue) line, the even-numbered B plane data "O'odd("jE")" is not also used, but may be also held and used in the subsequent processing in the same way.

Moreover, the above "synthesizing processing" does not require a special circuit but can configure the logic by using a general-purpose circuit easily obtained in general, and thus the bit width of each pixel data to be output is set to "16 bits". However, not limited by that, the bit width may be set to, for example, "14 bits" or "18 bits".

Incidentally, the data processing section 110 performs the interpolation processing on the synthesized data with a reduced data amount output by the above-described "synthesizing processing" after the "synthesizing processing".

Hereinafter, an example of this interpolation processing will be described. In the following explanation, the interpolation processing is performed not by a horizontal line (row) but by a plane of a horizontal line (row) and a vertical line (column) for simplification.

FIG. 8 is a block diagram of the interpolation processing.

Hereinafter, details of the interpolation processing will be described along this block diagram.

(1) Data Isolation Processing

When synthesized data "D" having a reduced data amount is input, the data processing section 110 isolates data of the G plane and the R plane (or the B plane) synthesized in input data from the input data by the following formulas (12) and (13) and outputs the plane data after the separation.

$$\text{Bayer}[11:0](r, c) = \begin{cases} D[9:0](r, c) << 2 \text{ bit} & (*1) \\ D[11:0](r, c) & (*2) \end{cases} \quad (12)$$

*1: if $"r = (\text{even number} \,\&\, c = \text{even number})"$
or
$"r = \text{odd number} \,\&\, c = \text{odd number}"$
*2: if $"r = (\text{odd number} \,\&\, c = \text{even number})"$
or
$"r = \text{even number} \,\&\, c = \text{odd number}"$ $$tmpG[11:0](r, c) = \qquad (13)$$
$$\begin{cases} D[15:10](r, c) << 6 \text{ bit} + D[15:12](r, c+1) << 2 \text{ bit} & (*1) \\ D[15:10](r, c) << 6 \text{ bit} + D[15:12](r, c-1) << 2 \text{ bit} & (*2) \\ D[11:0](r, c) & (*3) \end{cases}$$

*1: if $"r = \text{even number} \,\&\, c = \text{even number}"$
*2: if $"r = \text{odd number} \,\&\, c = \text{odd number}"$
*3: if $"r = \text{odd number} \,\&\, c = \text{even number}"$
or
$"r = \text{even number} \,\&\, c = \text{odd number}"$ Specifically, when "r" indicating the horizontal line (row) of the input data is an even number (R/Gr line) and "c" indicating the vertical line (column) is an even number ("D ("jE")" in FIG. 7), the data processing section 110 outputs data (12-bit-length) obtained by multiplying the 0th to 9th bit data by 4 as a first output "Bayer [11:0](r, c)" by the following expression (12). Furthermore, also when "r" is an odd number (Gb/B line) and "c" is an odd number ("D("jO")" in FIG. 7), the data processing section 110 similarly outputs data (12-bit-length) obtained by multiplying the 0th to 9th bit data by 4 as the first output "Bayer[11:0; ](r, c)".

In contrast, when "r" indicating the horizontal line (row) of the input data is an even number (R/Gr line) and "c" indicating the vertical line (column) is an odd number ("D(∓jO")" in FIG. 7), the data processing section 110 outputs the 0th to 11th bit data (12-bit-length) as it is as the first output "Bayer [11:0](r, c)". In addition, also when "r" is an odd number (Gb/B line) and "c" is an even number ("D("jE")" in FIG. 7), the data processing section 110 similarly outputs the 0th to 11th bit data (12-bit-length) as it is as the first output "Bayer [11:0](r, c)".

Furthermore, when "r" indicating the horizontal line (row) of the input data is an even number (R/Gr line) and "c" indicating the vertical line (column) is an even number ("D ("jE")" in FIG. 7), the data processing section 110 multiplies the 10th to 15th bit data by 64 by the following expression (13). Then, by adding the data obtained by the multiplication and the data obtained by multiplying the 12th to 15th bit data of "D("jO")" at the position of the subsequent "c+1", the data processing section 110 outputs the data (12-bit-length) obtained by the addition, as a second output "tmpG[11:0](r, c)".

Moreover, when "r" indicating the horizontal line (row) of the input data is an odd number (Gb/B line) and "c" indicating the vertical line (column) is an odd number ("D("jO")" in FIG. 7), the data processing section 110 multiplies the 10th to 15th bit data by 64. Then, by adding the data obtained by the multiplication and the data obtained by multiplying the 12th to 15th bit data of "D("jE")" at the position of the preceding "c−1" by 4, the data processing section 110 outputs the data (12-bit-length) obtained by the addition, as the second output "tmpG[11:0](r, c)".

Furthermore, when "r" indicating the horizontal line (row) of the input data is an odd number (Gb/B line) and "c" indicating the vertical line (column) is an even number ("D("jE")" in FIG. 7), or when "r" is an even number (R/Gr line) and "c" is an odd number ("D("jO")" in FIG. 7), the data processing section 110 outputs the 0th to 11th bit data (12-bit-length) as it is as the second output "tmpG[11:0](r, c)".

(2) G Plane Generation Processing

Subsequently, the data processing section 110 performs the "G plane generation processing" by the following expressions (14) and (15) through the use of the first output "Bayer (r, c)" and the second output "tmpG(r, c)" of the above-described "data isolation processing" as inputs. Meanwhile, data of the G plane (input as "tmpG(r, c)" in this processing) has been already generated, but that was generated based only on the gradient of a pixel signal level (pixel value) in the lateral (horizontal) direction of the screen, and thus, whether or not correlation in the longitudinal (vertical) direction for the data of the G plane is taken is newly evaluated.

$$dV(r, c) = \left| \frac{\text{Bayer}(r, c-2) + \text{Bayer}(r, c+2)}{2} - \text{Bayer}(r, c) \right|$$ (14)

$$dH(r, c) = \left| \frac{\text{Bayer}(r-2, c) + \text{Bayer}(r+2, c)}{2} - \text{Bayer}(r, c) \right|$$

$$G(r, c) = \begin{cases} tmpG(r, c) & (*1) \\ \frac{\text{Bayer}(r, c-1) + \text{Bayer}(r, c+1) + 2 \cdot tmpG(r, c)}{4} & (*2) \end{cases}$$ (15)

*1: if $''dV(r, c) - dH(r, c) > Th''$
*2: if $''dV(r, c) - dH(r, c) \leq Th''$

Specifically, when a difference between "dV(r, c)" and "dH(r, c)" obtained by the following expression (14) exceeds a predetermined threshold value "Th", "tmpG(r, c)" of the input is output as it is as "G(r, c)" without being correlated in the longitudinal (vertical) direction by the following expression (15). In contrast, when the differences drop to below the predetermined threshold value "Th", data of the result is output as "G(r, c)" by being correlated in the longitudinal (vertical) direction, by the following expression (15).

(3) R, B Plane Generation Processing

Then, the data processing section 110 performs the "R, B plane generation processing" by using the first output "Bayer (r, c)" of the above-described "data isolation processing" and the output "G(r, c)" of the above-described "G plane generation processing" as inputs. It should be noted that prior-art technologies can be applied to this "R, B plane generation processing", and here, the "R, B plane generation processing" is performed as an example by using a general method illustrated in the following expressions (16) to (19).

$$R(r, c) = \frac{\text{Bayer}(c-2, c) - G(r-2, c) + \text{Bayer}(r+2, c) - G(r+2, c)}{2} + G(r, c)$$ (16)

$$B(r, c) = \frac{\text{Bayer}(r, c-2) - G(r, c-2) + \text{Bayer}(r, c+2) - G(r, c+2)}{2} + G(r, c)$$

$$R(r, c) = \frac{\text{Bayer}(r, c-2) - G(r, c-2) + \text{Bayer}(r, c+2) - G(r, c+2)}{2} + G(r, c)$$ (17)

$$R(r, c) = \frac{\text{Bayer}(r-2, c) - G(r-2, c) + \text{Bayer}(r+2, c) - G(r+2, c)}{2} + G(r, c)$$

$$B(r, c) = (\text{Bayer}(r-1, c-1) - G(r-1, c-1) + \text{Bayer}(r+1, c-1) - G(r+1, c-1) + \text{Bayer}(r-1, c+1) - G(r-1, c+1) + \text{Bayer}(r+1, c+1) - G(r+1, c+1))/4 + G(r, c)$$ (18)

$$R(r, c) = (\text{Bayer}(r-1, c-1) - G(r-1, c-1) + \text{Bayer}(r+1, c-1) - G(r+1, c-1) + \text{Bayer}(r-1, c+1) - G(r-1, c+1) + \text{Bayer}(r+1, c+1) - G(r+1, c+1))/4 + G(r, c)$$ (19)

Specifically, the R plane "R(r, c)" and the B plane "B(r, c)" at a Gr pixel position are generated by using the following expression (16). Furthermore, the R plane "R(r, c)" and the B plane "B(r, c)" at a Gb pixel position are generated by using the following expression (17). Then, the B plane "B(r, c)" at an R pixel position is generated by using the following expression (18). In addition, the R plane "R(r, c)" at a B pixel position is generated by using the following expression (19).

The data processing section 110 outputs the data of the R plane and the B plane generated by the "R, B plane generation processing", respectively, as "R(r, c)" and "B(r, c)".

When moving image data made of "G(r, c)" of the output of the "G plane generation processing" and "R(r, c)" and "B(r, c)" of the outputs of the "R, B plane generation processing" is obtained as the result of the interpolation processing by the data processing section 110, the CPU 113 performs other required image processing (such as gamma correction and the like) on the moving image data and performs the operation at the time of shooting moving images already described.

(Supplementary Matters of Embodiment)

In the above, the embodiment of the digital camera (digital still camera) has been described as an example of the embodiment of the present invention, but the present invention can be applied also to other devices such as a digital video camera, a mobile phone and the like capable of photographing moving image.

In the above another embodiment, the "data isolation processing" and the "G plane generation processing" of the interpolation processing are performed separately for simplification of the explanation. However, since information (data) of "tmpG" of only the target pixel is actually used, the both can be processed at the same time.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to exact construction and operation illustrated and described, and accordingly all suitable modifications and equivalents may be resorted to, falling within the scope thereof.

EXPLANATION OF REFERENCE NUMERALS 101 imaging lens
102 lens drive section
103 imaging section
104 imaging sensor
105 AFE circuit
106 CDS circuit
107 gain regulator circuit
118 A/D conversion circuit
109 timing generator circuit
110 data processing section
111 display section
112 storage medium
113 CPU
114 bus

The invention claimed is:

1. A data processing apparatus comprising:
a horizontal interpolation unit which performs interpolation in order for each of pixels forming a horizontal line to have two color data and creates interpolation data for each of the pixels, one of the two color data being the interpolation data and another of the two color data being original pixel data, for each horizontal line of Bayer data output from an imaging section; and
a data size reducing unit which creates data having reduced data amount for each horizontal line by using the two color data of each of the pixels and outputs Bayer data being formed with the data being created,
wherein the horizontal interpolation unit performs the interpolation by using the following expressions (1) to (5):

$$IMP(i) = \frac{\sum_{a=0}^{3} k\_imp(a) \cdot Din(i + 2a - 3)}{\sum_{a=0}^{3} k\_imp(a)} \quad (1)$$

$$CD(i) = \begin{cases} Din(i) - IMP(i) & (\text{if } i = \text{even number}) \\ IMP(i) - Din(i) & (\text{if } i = \text{odd number}) \end{cases} \quad (2)$$

$$CD\_avg(i) = \frac{\sum_{a=-2}^{2} k\_cd(a + 2) \cdot CD(i + a)}{\sum_{a=-2}^{2} k\_cd(a + 2)} \quad (3)$$

$$IMP'(i) = \begin{cases} Din(i) - CD\_avg(i) & (\text{if } i = \text{even number}) \\ Din(i) + CD\_avg(i) & (\text{if } i = \text{odd number}) \end{cases} \quad (4)$$

$$Deven(i) = \begin{cases} Din(i) & (\text{if } i = \text{even number}) \\ IMP'(i) & (\text{if } i = \text{odd number}) \end{cases} \quad (5)$$

$$Dodd(i) = \begin{cases} IMP'(i) & (\text{if } i = \text{even number}) \\ Din(i) & (\text{if } i = \text{odd number}) \end{cases}$$

wherein Din(i) indicates data of a pixel in each horizontal line in the Bayer data, i indicates a position of the pixel in the each horizontal line, IMP(i) indicates the interpolation data being created, IMP'(i) indicates interpolation data being corrected, k_imp and k_cd each indicates a coefficient for weighting, CD(i) indicates a difference between the two color data, CD_avg(i) indicates an average of the difference, and Deven(i) and Dodd(i) each indicates data of a pixel to which the interpolation in the horizontal direction is performed.

2. A data processing apparatus comprising:
a horizontal interpolation unit which performs interpolation in order for each of pixels forming a horizontal line to have two color data and creates interpolation data for each of the pixels, one of the two color data being the interpolation data and another of the two color data being original pixel data, for each horizontal line of Bayer data output from an imaging section; and
a data size reducing unit which creates thinning data having reduced data amount for each horizontal line by using the two color data of each of the pixels and which synthesizes and outputs synthesized data having reduced data amounts of at least R plane data and B plane data from the thinning data,
wherein the data size reducing unit performs creation of the synthesized data by using the following expressions (6) to (7):

R/Gr Line: if j=even number)

$$D(j)[15:0] = O'even(j)[11:2] + O'odd(j)[11:6] \times 1024$$

R/GR Line: if j=odd number)

$$D(j)[15:0] = O'odd(j)[11:0] + O'odd(j-1)[5:2] \times 4096 \quad (6)$$

(Gb/B Line: if j=even number)

$$D(j)[15:0] = O'even(j)[11:0] + O'even(j+1)[5:2] \times 4096$$

(Gb/B Line: if j=odd number)

$$D(j)[15:0] = O'odd(j)[11:2] + O'even(j)[11:6] \times 1024 \quad (7)$$

wherein D(j) indicates the synthesized data and O'even(j) and O'odd(j) each indicates the data being reduced.

3. A data processing apparatus comprising:
a horizontal interpolation unit which creates interpolation data corresponding to each of pixel data of Bayer data output from an imaging section; and
a data size reducing unit which creates data having reduced data amount for each horizontal line by using the interpolation data being created and the pixel data of Bayer data output from the imaging section,
wherein the horizontal interpolation unit performs the interpolation by using the following expressions (8) to (12):

$$IMP(i) = \frac{\sum_{a=0}^{3} k\_imp(a) \cdot Din(i + 2a - 3)}{\sum_{a=0}^{3} k\_imp(a)} \quad (8)$$

$$CD(i) = \begin{cases} Din(i) - IMP(i) & (\text{if } i = \text{even number}) \\ IMP(i) - Din(i) & (\text{if } i = \text{odd number}) \end{cases} \quad (9)$$

$$CD\_avg(i) = \frac{\sum_{a=-2}^{2} k\_cd(a + 2) \cdot CD(i + a)}{\sum_{a=-2}^{2} k\_cd(a + 2)} \quad (10)$$

$$IMP'(i) = \begin{cases} Din(i) - CD\_avg(i) & (\text{if } i = \text{even number}) \\ Din(i) + CD\_avg(i) & (\text{if } i = \text{odd number}) \end{cases} \quad (11)$$

$$Deven(i) = \begin{cases} Din(i) & (\text{if } i = \text{even number}) \\ IMP'(i) & (\text{if } i = \text{odd number}) \end{cases} \quad (12)$$

$$Dodd(i) = \begin{cases} IMP'(i) & (\text{if } i = \text{even number}) \\ Din(i) & (\text{if } i = \text{odd number}) \end{cases}$$

wherein Din(i) indicates data of a pixel in each horizontal line in the Bayer data, i indicates a position of the pixel in the each horizontal line, IMP(i) indicates the interpolation data being created, IMP' indicates interpolation data being corrected k_imp and k_cd each indicates a coefficient for weighting, CD(i) indicates a difference between the two color data, CD_avg(i) indicates an average of the difference, and Deven(i) and Dodd(i) each indicates data of a pixel to which the interpolation in the horizontal direction is performed.

4. The data processing apparatus according to claim 3, wherein
the created interpolation data and the pixel data of Bayer data are different color data.

5. A data processing apparatus comprising:
a horizontal interpolation unit which creates interpolation data corresponding to each of pixel data of Bayer data output from an imaging section; and
a data size reducing unit which creates data having reduced data amount for each horizontal line by using the interpolation data being created and the pixel data of Bayer data output from the imaging section,
wherein the data size reducing unit performs creation of the synthesized data by using the following expressions (13) to (14):

R/Gr Line: if j=even number)

$$D(j)[15:0]=O'\text{even}(j)[11:2]+O'\text{odd}(j)[11:6]\times 1024$$

R/GR Line: if j=odd number)

$$D(j)[15:0]=O'\text{odd}(j)[11:0]+O'\text{odd}(j-1)[5:2]\times 4096 \qquad (13)$$

(Gb/B Line: if j=even number)

$$D(j)[15:0]=O'\text{even}(j)[11:0]+O'\text{even}(j+1)[5:2]\times 4096$$

(Gb/B Line: if j=odd number)

$$D(j)[15:0]=O'\text{odd}(j)[11:2]+O'\text{even}(j)[11:6]\times 1024 \qquad (14)$$

wherein D(j) indicates the synthesized data and O'even(j) and O'odd(j) each indicates the data being reduced.

6. The data processing apparatus according to claim 5, wherein
the created interpolation data and the pixel data of Bayer data are different color data.

* * * * *